INVENTOR;
WALTER PEARSON, DECEASED
VIRGINIA M. PEARSON, ADMTRX.

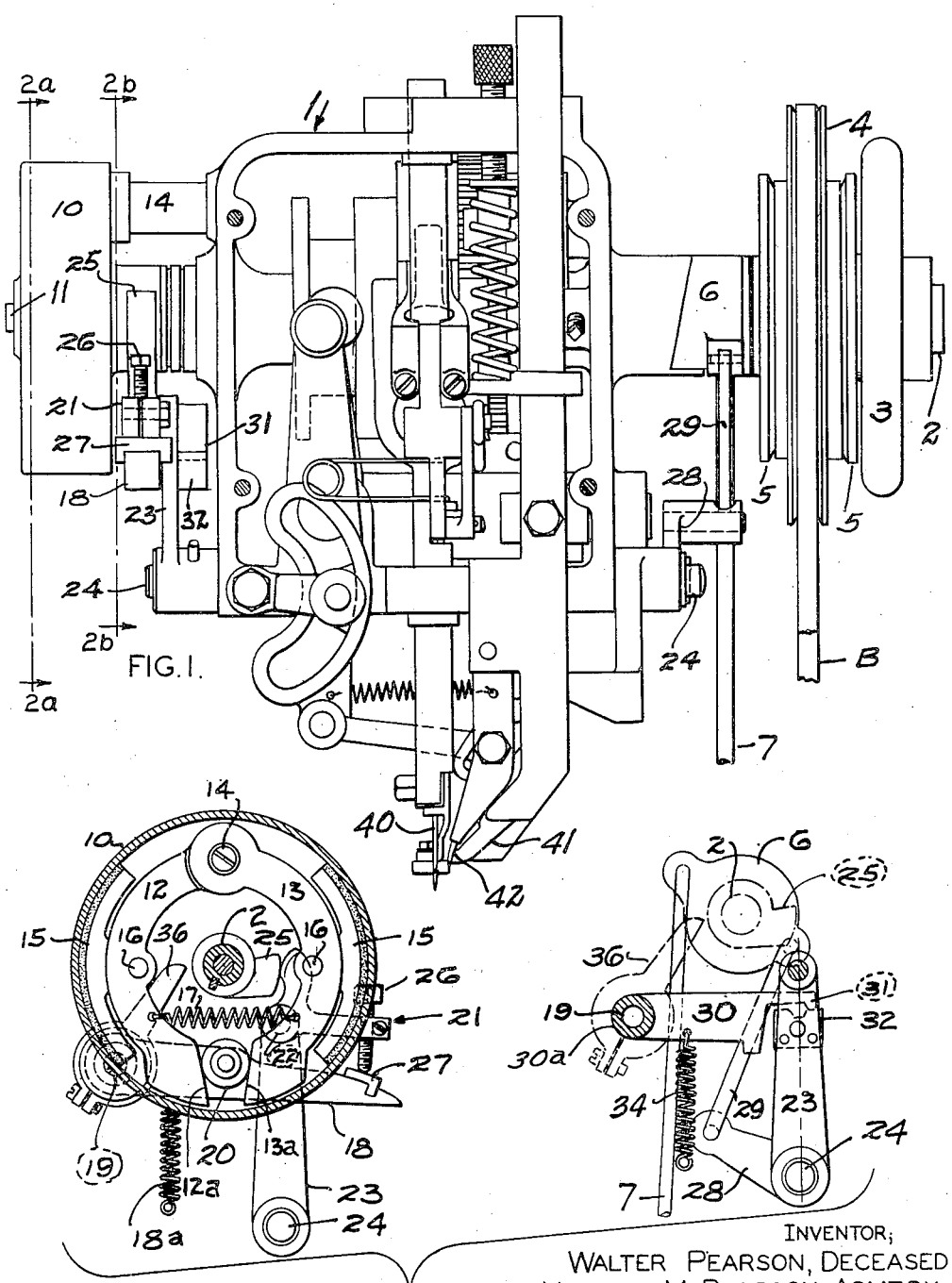

BY Rodney Bedell
ATTORNEY

Jan. 10, 1950    W. PEARSON    2,494,452
CLUTCH AND BRAKE CONTROL FOR SHOE STITCHERS
Filed April 27, 1944    3 Sheets-Sheet 3

INVENTOR,
WALTER PEARSON, DECEASED
VIRGINIA M PEARSON, ADMTRX.
BY Rodney Bedell
ATTORNEY Patented Jan. 10, 1950

2,494,452

UNITED STATES PATENT OFFICE 2,494,452

CLUTCH AND BRAKE CONTROL FOR SHOE STITCHERS

Walter Pearson, deceased, late of Whitman, Mass., by Virginia M. Pearson, administratrix, Whitman, Mass., assignor to Landis Machine Company, St. Louis, Mo., a corporation of Missouri Application April 27, 1944, Serial No. 532,992

9 Claims. (Cl. 192—144)

The invention relates to sewing machines, and particularly to a sewing machine of the type illustrated in Walter Pearson Patent 2,003,461, issued June 4, 1935. The invention consists in a brake and clutch control for such a machine.

One object of the invention is to brake the operating shaft so that the machine will stop automatically at a predetermined point in the cycle of operations with its needle, feed point and presser foot positioned so that the work may be drawn from the machine without further manipulation of the machine.

Another object is to control the brake and its actuating mechanism from the clutch by which the operating shaft is driven so that disengaging the clutch automatically results in the seating of the brake to function as described above.

Another object is to provide simply for a plural speed drive for a machine of the type referred to. This object is attained by clutch slippage and it is a further object to associate the clutch and brake structure so that they are readily controlled by a single manually actuated part.

Another object is to adapt a brake which is applicable to a machine as described in said patent without reconstructing the parts of the machine previously used.

These and other detailed objects as will appear below are attained by the structure illustrated in the accompanying drawings, in which—

Figure 1 is a front view of the head of a shoe stitcher which will be mounted upon a suitable frame or table and will include the main operating shaft.

Figure 2 shows the brake and brake-clutch connection when the brake is set and the machine is stationary. The left hand portion of Figure 2 is a transverse vertical section taken on the line 2a—2a of Figure 1 and the right hand portion of Figure 2 is a similar section taken on the line 2b—2b of Figure 1, non-essential parts being eliminated.

Figure 3:
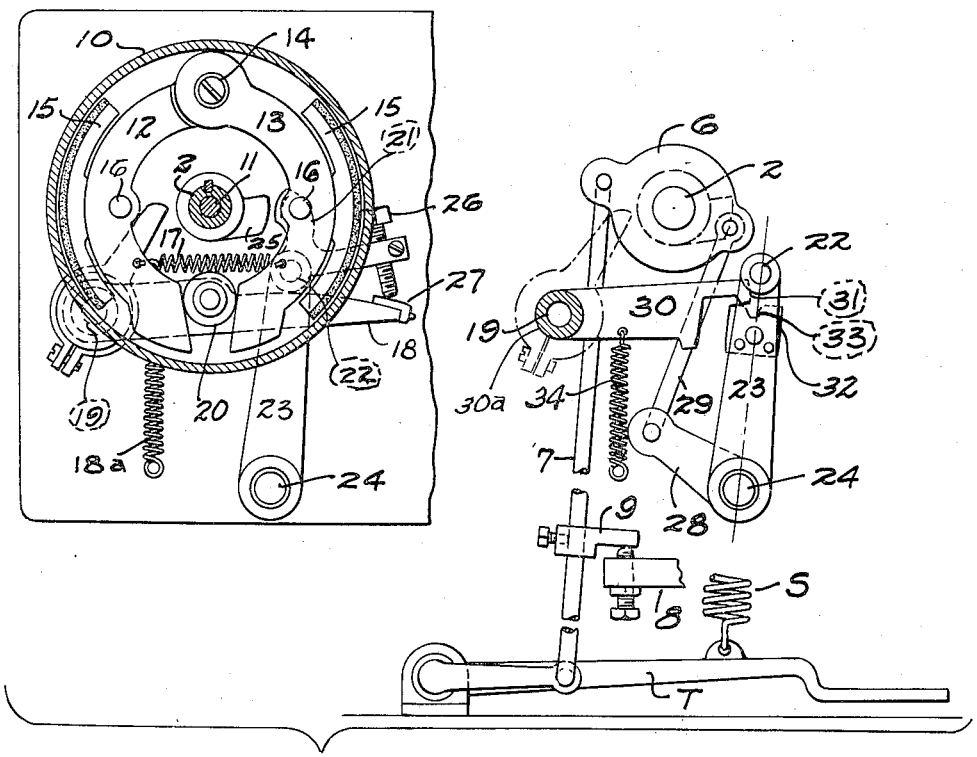
Figure 4:
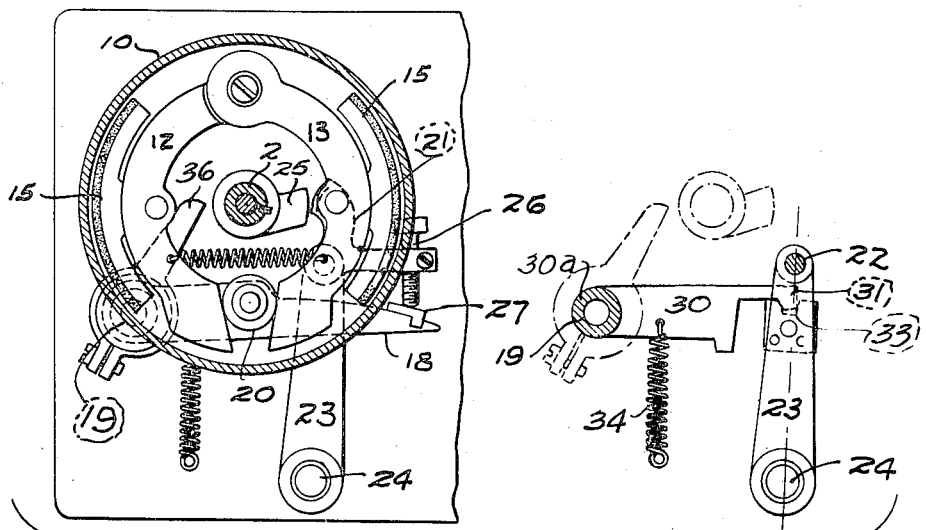
Figure 5:
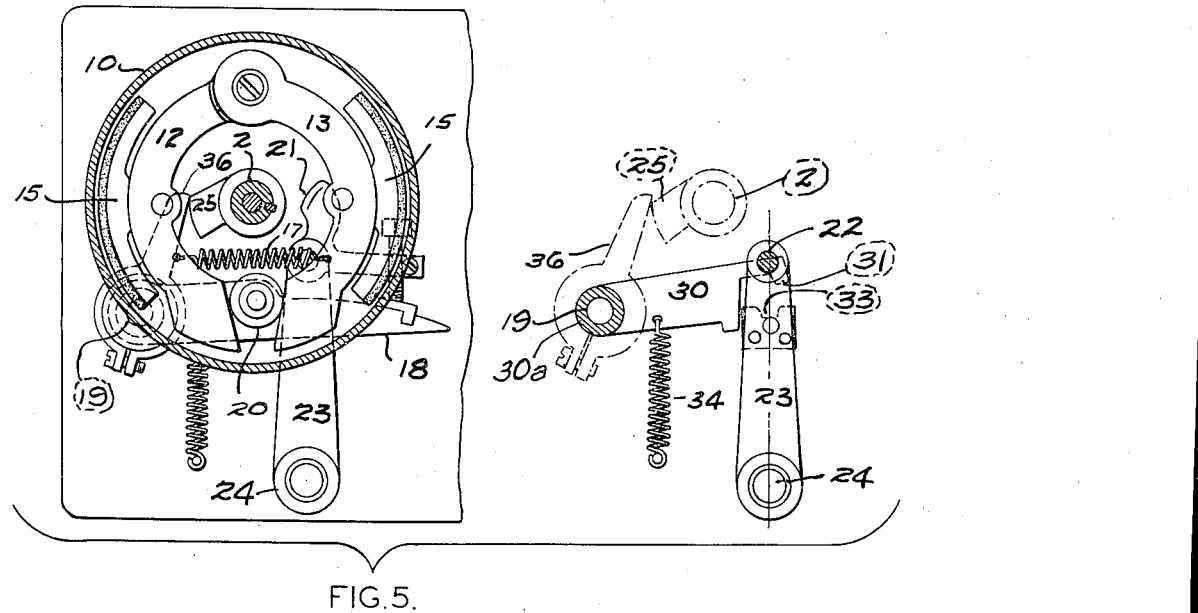

Figures 3, 4 and 5 each illustrates the head parts shown in Figure 2 in a different position assumed in the cycle of operations of the machine. Figure 3 also illustrates a treadle connection by which the clutch and brake are controlled manually.

The stationary portion of the head which may be considered a part of the machine frame is indicated at 1 and the main operating shaft 2 is journalled in frame 1. A hand wheel 3 is fixed on the right hand end of the shaft. A sheave pulley 4, driven by a belt B, rotates freely on shaft 2. Friction discs 5 are between pulley 4 and wheel 3 and a ring 6 forming an end thrust cam whereby the pulley drives the shaft when the cam is rotated by a link 7 connected to a foot treadle T (Figure 3). When the operator releases the treadle, a spring S connecting the same to the machine frame will lift the treadle and permit the clutch to disengage. A stop 8 on the machine frame is in the path of a dog 9 on link 7 and limits the rotary movement of cam 6 to avoid locking the pulley and discs together.

A brake drum 10 is keyed to the left hand end of shaft 2 and is held to the shaft by a stud 11. Brake arms 12 and 13 are pivotally suspended at 14 from frame 1 and brake shoes 15 are pivotally mounted at 16 on arms 12 and 13 and are opposed to the inner surface of drum 10 on the shaft. A spring 17 tends to draw brake arms 12 and 13 towards each other to release the brake. A lever 18 is rotatable on a stud 19 which projects from frame 1 parallel to main shaft 2. Lever 18 carries a roller 20 which engages the downwardly converging ends 12a and 13a of arms 12 and 13 and forces the arms apart to apply the brake when the lever is moved downwardly. Normally the thrust of faces 12a and 13a against roller 20 will raise the latter and lever 18 against the pull of spring 18a which is provided solely to hold lever 18 against vibration and does not apply the brake. Lever 18 may be moved to apply the brake by the horizontal leg of a bell crank lever 21 pivoted at 22 on the upper end of an arm 23 fixed on a jack shaft 24 journaled in frame 1 and parallel to main shaft 2.

When the parts are in the position shown in Figure 2, a cam 25, fixed on main shaft 2, engages the upright leg of bell crank lever 21 and moves the latter so that its horizontal leg, through contact screw 26, thrusts downwardly on lever 18, through a wear plate 27, to set the brake, as described above. A locking bar 30, the function of which is described below, is fixed to stub shaft 19 and has a tooth 31 which rests on the top of a block 32, rigid with arms 23, when the parts are in the position shown in Figure 2.

An arm 28 on the right hand end of jack shaft 24 is connected by a link 29 to cam ring 6 so that when the operator depresses treadle T, jack shaft 24 is rotated in a clockwise direction and arm 23 is moved to the right, as shown in Figure 3. This moves bell crank lever 21 out of the range of cam 25 and the latter will revolve without affecting the brake. During the movement of arm 23 from the position shown in Figure 2 to the position shown in Figure 3, tooth 31 on bar 30 will ride into a notch 33 in block 32 and then out of the notch onto the upper end of block 32 as shown, the left hand side of the notch and the opposing face of the tooth being curved to accommodate such movement of the tooth.

Upon release of treadle T and its elevation by spring S, shaft 24 and arm 23 rotate in an anti-clockwise direction to the position shown in Figure 4, a position intermediate those shown in Figures 2 and 3, and the arm is held, at least temporarily, in this position by tooth 31 entering notch 33 and abutting the right hand side of the notch, spring 34 insuring the downward movement of bar 30. In this position of the parts, although arm 23 and bell crank lever 21 have moved towards shaft 2, cam 25 will still clear bell crank lever 21 and will not affect the brake.

The connection between end thrust cam 6 and jack shaft 24 is so adjusted that when the parts are in the positions shown in Figure 4, pressure between friction discs 5 and pulley 4 is reduced so that the clutch will slip without being completely disengaged, thus rotating shaft 2 at a reduced speed. The operator, through treadle T, may hold the parts in the position shown in Figure 4 as long as he desires to operate the machine at the reduced speed. If he desires to resume full speed, he depresses treadle T further, thus returning the parts to the position shown in Figure 3, tightening the clutch.

If the operator completely releases treadle T at any time, the ensuing revolution, or partial revolution, of shaft 2, due to the friction between clutch discs 5 and to momentum of the mechanism, will bring cam 25 to the position shown in Figure 5 where it engages a short arm 36 adjustably clamped about a shoulder 30a on bar 30. Cam 25 will move arm 36 in an anticlockwise direction, raising the outer end of bar 30 so that its tooth 31 is lifted out of notch 33 which permits spring S (through treadle T, link 7, cam 6, link 29 and arm 28) to rotate jack shaft 24 and arm 23 to the position shown in Figures 5 and 2 where bell crank lever 21 will be in position to be engaged by cam 25 as it moves from the position shown in Figure 5 to the position shown in Figure 2, thus setting the brake.

It will be understood that the brake pressure is sufficient to bring the machine to a complete stop between the time that cam 25 first engages the upright arm of bell crank lever 21 and the time that the high point of the cam engages the bell crank lever and the maximum thrust on the brake arms is produced. Hence the machine will always be stopped at substantially the same point in a cycle of operations and this will be timed to accord with the elevation of the needle 40 and presser foot 41 and the retraction of the feed point 42 from the work.

The structure makes it possible for the operator to limit each operation to a single stitch if so desired. This may be done by depressing the treadle, which throws in the clutch, and immediately releasing the treadle, whereupon the friction between sliding discs 5 will continue to operate the machine throughout the completion of the single cycle. Such manipulation is desirable during certain operations even though additional stitching should be required after rearrangement of the work.

It will be understood that the arrangements of the cams and levers and other details may be varied substantially without departing from the essential features of the invention, and the exclusive use of those modifications of the structure coming within the scope of the claims is contemplated.

What is claimed is:

1. In a sewing machine, an operating shaft provided with a driver and a brake, a clutch for connecting the shaft to the driver, a manually operable member for controlling said clutch, shaft actuated structure for applying the brake, mechanism automatically holding said structure inoperative when the clutch is engaged, and shaft-operated means associated with said structure for releasing the brake from said mechanism when said clutch is disengaged.

2. In a sewing machine, an operating shaft, a driver therefor, a clutch for engaging and disengaging the shaft and driver, a brake mechanism including a brake applying lever, a cam on said shaft for directly engaging said lever, a member mounting said lever and movable to different positions to place the lever in the path of said cam and to clear said cam respectively, a manually operable device for controlling said clutch, and means associated therewith and automatically shifting said member to position in which said lever clears said cam when the clutch is engaged and to position in which said cam engages said lever when the clutch is disengaged.

3. In a sewing machine having a frame, a main operating shaft, a clutch through which the main shaft is driven, and a manually operable member for engaging and disengaging the clutch, cooperating friction elements associated with the frame and main shaft respectively, a lever for actuating said elements to brake the main shaft, a movable fulcrum for said lever, a cam associated with said shaft and clearing said lever when said fulcrum is in one position and directly engaging said lever to set the brake at a predetermined point in the cycle of said shaft when said fulcrum is in a different position, and means controlled by said manually operable member to move said fulcrum from the first-mentioned position to the second-mentioned position when the clutch is disengaged and vice versa.

4. In a sewing machine, an operating shaft provided with a driver and a brake, a friction clutch for connecting the shaft to the driver and adapted to be partially released to drive the shaft at reduced speed, a manually operable member for controlling said clutch, structure for applying the brake, mechanism automatically holding said structure inoperative when the clutch is engaged or is partially released, and mechanism associated with said structure actuated by said shaft for releasing the brake from said mechanism when said clutch is disengaged.

5. In a sewing machine, an operating shaft provided with a driver and a brake, a friction clutch for connecting the shaft to the driver and by which the shaft may be driven fast or slow as desired, a manually operable member for controlling said clutch, structure for applying the brake, mechanism acting automatically for holding said structure inoperative except when the clutch is disengaged, said mechanism being arranged to hold the clutch partially released throughout a predetermined portion of the cycle of operations after manual operation of said member and before said mechanism is released.

6. In a sewing machine, a frame, a drive shaft journalled therein, a brake drum fixed on said shaft, a pair of brake arms pivoted on the frame and having individual shoes arranged at opposite sides of said drum, a lever for moving said arms to apply said shoes to said drum, a cam on said shaft for engaging said lever to move as described, said lever having a movable fulcrum, and a manually operable device for shifting said fulcrum to space the lever from the cam and render the cam ineffective.

7. In a sewing machine, a frame, a drive shaft journalled therein, a brake drum on said shaft having an internal periphery, arcuate brake arms at opposite sides of said shaft with adjacent ends pivoted to the frame and with their other ends separated and having opposing surfaces converging towards each other radially of the shaft, there being brake shoes on said arms opposing said drum periphery at opposite sides of said shaft, a lever extending transversely of the drum and carrying a part positioned between said surfaces and arranged, when the lever moves said part in one direction radially of the shaft, to engage the ends of the arms and thrust the shoes in opposite directions against said drum periphery, a cam on said main shaft, a manually shiftable member, a bell crank fulcrumed on said member with one leg in cooperative relation with said lever, said member, when shifted in one direction, bringing the other leg of said bell crank into cooperative relation with said cam so that rotation of the shaft and cam will set the brake and, when shifted in the opposite direction, spacing said latter-mentioned bell crank leg from said cam so that rotation of the shaft and cam will not affect the brake.

8. In a sewing machine having a frame and a main shaft journalled therein, a driver and a clutch comprising interengaging elements for connecting said shaft and driver, a manually operable member for engaging said clutch elements, means operable to disengage said clutch when said member is released from manual control, a device for positively holding said means inoperative temporarily when said member is partially released by the operator, a brake for said shaft, and a member actuated by said shaft when said member is completely released by the operator and rendering said device ineffective at one point in the cycle of operation of the machine and for subsequently setting said brake.

9. In a sewing machine, a main shaft, a driver, a clutch for connecting the shaft to the driver, a brake for stopping the rotation of the shaft when the clutch is released, a manually operable member having movement into one position to engage the clutch and to another position to release the clutch and to an intermediate position to slip the clutch, a lock-out device for holding the brake inoperative indefinitely when said member is in said intermediate position, and means automatically releasing the brake from said device at a predetermined point only during a cycle of operations of the machine following movement of the member from said intermediate position to said clutch releasing position.

VIRGINIA M. PEARSON,
*Administratrix of the Estate of Walter Pearson, Deceased.*

REFERENCES CITED

The following references are of record in the file of this patent:

UNITED STATES PATENTS

| Number | Name | Date |
|---|---|---|
| 1,666,275 | Walsh | Apr. 17, 1928 |
| 1,968,873 | Clark | Aug. 7, 1934 |
| 2,024,293 | Keall et al. | Dec. 17, 1935 |
| 2,330,555 | Cameron | Sept. 28, 1943 |